(12) United States Patent
Uhlir-Tsang et al.

(10) Patent No.: US 6,814,789 B2
(45) Date of Patent: Nov. 9, 2004

(54) USE OF ADDITIVES TO REDUCE PUDDLING IN INKJET INKS

(75) Inventors: Linda C. Uhlir-Tsang, Corvallis, OR (US); John R Moffatt, Corvallis, OR (US); Mary E Austin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 10/254,993

(22) Filed: Sep. 24, 2002

(65) Prior Publication Data

US 2004/0055507 A1 Mar. 25, 2004

(51) Int. Cl.[7] .............................................. C09D 11/02
(52) U.S. Cl. ............................. 106/31.27; 106/31.35; 106/31.58
(58) Field of Search ....................... 106/31.27, 31.35, 106/31.58

(56) References Cited

U.S. PATENT DOCUMENTS

| | | | | |
|---|---|---|---|---|
| 4,165,399 A | * | 8/1979 | Germonprez ................ | 427/264 |
| 4,166,044 A | * | 8/1979 | Germonprez et al. ..... | 106/31.43 |
| 4,361,843 A | | 11/1982 | Cooke et al. | |
| 4,758,276 A | * | 7/1988 | Lin et al. .................. | 106/31.35 |
| 4,793,264 A | * | 12/1988 | Lin et al. .................. | 106/31.35 |
| 5,019,166 A | * | 5/1991 | Schwarz .................... | 106/31.43 |
| 5,091,004 A | * | 2/1992 | Tabayashi et al. ........ | 106/31.57 |
| 5,344,483 A | * | 9/1994 | Hinton ...................... | 106/31.35 |
| 5,462,592 A | * | 10/1995 | Murakami et al. ........ | 106/31.43 |
| 5,626,655 A | | 5/1997 | Pawlowski et al. ....... | 106/31.27 |
| 5,785,743 A | | 7/1998 | Adamic et al. ........... | 106/31.27 |
| 5,916,358 A | * | 6/1999 | Bagchi et al. ............. | 106/31.59 |
| 5,946,012 A | | 8/1999 | Courian et al. ............ | 347/63 |
| 6,149,719 A | | 11/2000 | Houle ........................ | 106/31.14 |
| 6,177,485 B1 | | 1/2001 | Moffatt et al. .............. | 523/160 |
| 6,235,099 B1 | | 5/2001 | Aida et al. ................ | 106/31.65 |
| 6,290,331 B1 | | 9/2001 | Agarwal et al. .............. | 347/47 |
| 6,593,398 B2 | * | 7/2003 | Breton et al. ................ | 523/160 |
| 2004/0035323 A1 | * | 2/2004 | Suzuki et al. ............. | 106/31.65 |

FOREIGN PATENT DOCUMENTS

| | | |
|---|---|---|
| EP | 0404474 A1 | 12/1990 |
| EP | 1239014 A1 | 9/2002 |
| EP | 1279707 A1 | 1/2003 |
| EP | 1304364 A1 | 4/2003 |

OTHER PUBLICATIONS

U.S. Patent Application Publication No. US 2002/0035172 A1, Publication Date Mar. 21, 2002.

* cited by examiner

Primary Examiner—Helene Klemanski (57) ABSTRACT

A puddling additive comprising an anionic, polar group and a $C_6$–$C_{30}$ hydrocarbon tail for use in reducing puddling in an inkjet ink. The anionic, polar group is a carboxylate or phosphate group and the $C_6$–$C_{30}$ hydrocarbon tail is a saturated or unsaturated $C_6$–$C_{30}$ hydrocarbon chain. An inkjet ink comprises a puddling additive, a dye, and an ink vehicle. A method of reducing puddling in an inkjet ink is also disclosed. The method comprises adding the puddling additive to the inkjet ink.

18 Claims, 8 Drawing Sheets

USE OF ADDITIVES TO REDUCE PUDDLING IN INKJET INKS

BACKGROUND OF THE INVENTION

Field of the Invention

The present invention relates to an additive used to reduce puddling in inkjet inks. More specifically, the invention relates to a puddling additive having an anionic, polar group and a $C_6$–$C_{30}$ hydrocarbon tail.

Inkjet printing is a popular alternative for home and office printing due to the low cost of inkjet printers, advances in quality of the printed images, and the relatively noise-free operation. Notwithstanding these advantages, research and development continue in order to improve inkjet print quality while maintaining a reasonable cost for the inkjet printer and the printing process.

To produce high quality images, the inkjet ink must be compatible with the inkjet pen and the print medium. The properties of an optimal inkjet ink include, among others, low puddling, good crusting resistance, good stability, low color-to-color bleed, and rapid dry time. In addition, the inkjet ink must be capable of passing through the inkjet orifice without clogging the orifice or puddling on the orifice plate. The inkjet ink should also permit rapid cleanup of the machine components with minimal effort. Although inkjet inks are known to possess one or more of the foregoing properties, few inkjet inks possess all of these properties because an improvement in one property often negatively impacts another property.

While the overall print quality of inkjet inks is generally high, puddling of inkjet inks still occurs on the orifice plate of the printhead. Inkjet inks comprising magenta dyes are known to exhibit worse puddling than cyan and yellow dyes. Puddling occurs when the ink that is ejected through the orifices does not reach the print medium. Instead, the inkjet ink collects on an outer surface of the orifice plate or puddles adjacent to the edge of the orifice. This occurs when ink drops exiting the orifices leave behind minute amounts of ink on the orifice plate around each orifice. The extent of the puddling varies from a few, small drops of ink to the formation of large puddles on large portions of the orifice plate. Large puddles partially or completely block the orifices and cause missing nozzles, false low decap values, or changes in the trajectory of the ink drops. The change in trajectory results in the ink drop not hitting its targeted pixel center, which creates printing errors on the media and reduces the quality of the printed image.

Various solutions to address the problem of puddling have been proposed. Some solutions propose modifying the printhead or pen to reduce puddling, while other solutions modify the inkjet ink composition. For example, a coating of hydrophobic material is applied to the printhead to reduce its wettability and, thereby, reduce puddling. However, this modification to the printhead is costly. A combination of pen architecture and modifications to the inkjet ink composition has been suggested to reduce puddling.

Other proposed modifications to the inkjet inks include adding anionic and nonionic surfactants to the inkjet ink. Similarly, others have proposed adding a first surfactant and a second surfactant to reduce puddling. The first surfactant has a hydrophilic-lipophilic balance ("HLB") value of 1.5 units lower than the second surfactant. Additional modifications include adding salts to the inkjet inks. However, adding salts or surfactants causes reliability and materials interaction issues because the additives cannot be used with all dyes or ink vehicles. In addition, adding surfactants or salts negatively affects desirable properties of the inkjet inks.

It would be desirable to reduce puddling of inkjet inks by using additives that are effective in low amounts and do not negatively affect other properties of the inkjet inks. In addition, it would be desirable to use additives that are effective in many types of, ink vehicles.

BRIEF SUMMARY OF THE INVENTION

A puddling additive used in an inkjet ink is disclosed. The puddling additive comprises an anionic, polar group and a $C_6$–$C_{30}$ hydrocarbon tail. A method of reducing puddling in inkjet inks is also disclosed. The method comprises adding a puddling additive to the inkjet ink.

A set of inkjet inks is also disclosed. Each inkjet ink comprises a dye, an aqueous ink vehicle, and a puddling additive, which comprises an anionic, polar group and a $C_6$–$C_{30}$ hydrocarbon tail.

BRIEF DESCRIPTION OF THE SEVERAL VIEWS OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

An additive used to reduce puddling in an inkjet ink is disclosed. The puddling additive includes an anionic, polar group and a $C_6$–$C_{30}$ hydrocarbon tail. In addition to the puddling additive, the inkjet ink comprises a dye and an ink vehicle. A method of reducing puddling in inkjet inks is also disclosed. The method comprises adding a puddling additive having an anionic, polar group and a $C_6$–$C_{30}$ hydrocarbon tail to an inkjet ink. A set of inkjet inks is also disclosed.

The amounts of the components in the inkjet ink are expressed in weight percent ("wt %") of the total weight of the ink composition. The purity of all components is that used in normal commercial practice for inkjet inks.

An inkjet ink of the present invention may comprise a colorant, such as a dye or pigment, an ink vehicle, and a puddling additive. If the colorant is a dye, the dye may be nonionic, cationic, anionic, or a mixture of nonionic, cationic, and/or anionic dyes. Dyes are well known in the art and are commercially available from numerous sources including, but not limited to, Avecia (Wilmington, Del.), Mitsubishi Chemical Corp. (Tokyo, Japan), and Ilford AG (Fribourg, Switzerland). The dye may include an Acid, Direct, Food, Mordant, or Reactive dye and may be water-soluble or water-insoluble. Examples of dyes include, but are not limited to, sulfonate and carboxylate dyes, specifically, those dyes that are commonly employed in inkjet printing. Specific examples of dyes that may be used in the inkjet ink include, but are not limited to, Sulforhodamine B (sulfonate), Acid Blue 113 (sulfonate), Acid Blue 29 (sulfonate), Acid Red 4(sulfonate), Rose Bengal (carboxylate), Acid Yellow 17 (sulfonate), Acid Yellow 29 (sulfonate), Acid Yellow 42 (sulfonate), Acridine Yellow G (sulfonate), Acid Yellow 23, Acid Blue 9, Nitro Blue Tetrazolium Chloride Monohydrate or Nitro BT, Rhodamine 6G, Rhodamine 123, Rhodamine B, Rhodamine B Isosyanate, Safranine 0, Azure B, and Azure B Eosinate, all of which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow. The dye is not critical to the operability of the present invention and, therefore, the selection of dye is not discussed in detail. Rather, it is understood that one of ordinary skill in the art could select any suitable dye for use in the present invention.

In addition to color dyes or pigments, black dyes or pigments may be used in the inkjet ink. For example, Direct Black 154, Direct Black 168, Fast Black 2, Direct Black 171, Direct Black 19, Acid Black 1, Acid Black 191, Mobay Black SP, or Acid Black 2 may be used.

The dye may be present in the inkjet ink in a range from approximately 0.1 wt % to approximately 15 wt % of the total weight of the inkjet ink, with approximately 0.5 wt % to approximately 5 wt % being preferred. The amount of dye necessary in the inkjet ink is largely dependent on the solubility of the dye in the ink vehicle, the desired color to be achieved with the inkjet ink, and the purity and strength of the dye.

The ink vehicle may comprise an aqueous-based ink vehicle that includes water or a mixture of water and at least one water-soluble organic solvent. The water-soluble organic solvent may include, but is not limited to, an aliphatic alcohol, an aromatic alcohol, a diol, a glycol ether, a poly(glycol) ether, a caprolactam, a formamide, an acetamide, and a long chain alcohol, or mixtures thereof. Examples of organic solvents employed in the practice of this invention include, but are not limited to, primary alcohols of 30 carbons or less, primary aromatic alcohols of 30 carbons or less, secondary aliphatic alcohols of 30 carbons or less, secondary aliphatic alcohols of 30 carbons or less, 1,3-alkyldiols of 30 carbons or less, alkyltriols of 30 carbons or less, 1,3-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific organic solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methyl-3-methylbutanol, glycerol, 3-pyridylcarbinol, pentaerythritol, 1,2-alkyldiols, and mixtures thereof. For instance, the water-soluble organic solvent in the ink vehicle may include a mixture of a diol, a polyglycol ether, and a glycol ether. The water-soluble organic solvent(s) is present in a range from approximately 0.01 wt % to approximately 50 wt % of the total weight of the inkjet ink, with approximately 0.1 wt % to approximately 20 wt % being preferred.

The ink vehicle may optionally include surfactants, humectants, buffers, preservatives, biocides, and/or viscosity modifiers, depending on the desired properties of the inkjet ink. For instance, at least one surfactant may be used in the ink vehicle. The surfactant may be a nonionic, amphoteric, or ionic surfactant. Nonionic and amphoteric surfactants include TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide block copolymers; SURFYNOL® compounds, which are acetylenic polyethylene oxides available from Air Products (Allentown, Pa.); polyethylene oxide ("POE") esters; POE diesters; POE amines; POE amides; and dimethicone copolyols. The concentration of surfactant employed in the present invention may range from approximately 0 wt % to approximately 40 wt % of the total weight of the inkjet ink, preferably from approximately 0.01 wt % to 5 wt %.

Buffers may be used to maintain the inkjet ink at a desired pH. The buffer may be an organic-based biological buffer or an inorganic buffer. The buffers employed may provide a pH ranging from approximately 3 to approximately 9, preferably from approximately 6 to approximately 9, and most preferably from approximately 8 to approximately 8.5. Examples of buffers include Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO").

The puddling additive may comprise an anionic, polar group and a $C_6$–$C_{30}$ hydrocarbon tail. The anionic, polar group and $C_6$–$C_{30}$ hydrocarbon tail may be directly attached to one another or indirectly attached by a spacer. Depending on the pH of the inkjet ink, the puddling additive may also be associated with a counterion, such as a sodium or ammonium salt.

The anionic, polar group may include, but is not limited to, a carboxylate, a sulfocarboxylate, a phosphonocarboxylate, a sarcoside, a sulfate, a polyoxyethylene sulfate, a sulfonate, a polyoxyethylene sulfonate, a phosphate, a polyoxyethylene phosphate, a phosphonate, or a polyoxyethylene phosphonate group. The $C_6$–$C_{30}$ hydrocarbon tail may be a saturated or unsaturated hydrocarbon chain comprising between 6 and 30 carbons. The hydrocarbon chain may be either a straight or branched chain. If the $C_6$–$C_{30}$ hydrocarbon tail is unsaturated, it may have at least one site of unsaturation, such as a carbon-carbon double bond or a carbon-carbon triple bond. The stereochemistry of substituents attached to the site of unsaturation may be either cis or trans.

In one embodiment, the puddling additive has a carboxylate group as the anionic, polar group and a hydrocarbon chain comprising between 6 and 18 carbons as the $C_6$–$C_{30}$ hydrocarbon tail. The $C_6$–$C_{30}$ hydrocarbon tail also has between 0 and 2 carbon-carbon double bonds.

In another embodiment, the puddling additive has a phosphate group as the anionic, polar group and a hydrocarbon chain comprising 18 carbons as the $C_6$–$C_{30}$ hydrocarbon tail.

The puddling additive may be present in the inkjet ink in an amount effective to reduce puddling and may be soluble in the inkjet ink in the amount used. The amount of puddling additive present in the inkjet ink may be an amount sufficient to reduce puddling without negatively impacting other properties of the inkjet inks. The puddling additive may be present in an amount ranging from approximately 0.1 wt % to approximately 2.0 wt % of the total weight of the inkjet ink. Since the puddling additive does not negatively affect other properties of the inkjet inks, the puddling additive may be used over a wide variety of ink vehicles. In addition, more than one puddling additive may be used in the inkjet ink to achieve the desired reduction in puddling.

The puddling additive may be commercially available in reagent grade purity (99+% purity). In addition, the puddling additive may be synthesized by techniques known in the art. For example, a puddling additive having an odd number of carbons in the hydrocarbon chain, a branched hydrocarbon chain, more than two sites of unsaturation, or a stereochemistry that is not commercially available may be synthesized by techniques known in the art.

Saturated and unsaturated carboxylic acid surfactants may be used as the puddling additive. For example, a saturated carboxylic acid surfactant including, but not limited to, stearic acid may be used as the puddling additive. Stearic acid has a $C_{18}$ hydrocarbon chain and is available from Sigma-Aldrich Corp. (St. Louis, Mo.). Unsaturated carboxylic acid surfactants including, but not limited to, linoleic acid, oleic acid, elaidic acid, or trans-trans-2,4-hexadienoic acid may also be used as the puddling additive. Linoleic acid has a $C_{18}$ hydrocarbon chain having two sites of unsaturation. trans-trans-2,4-hexadienoic acid has a $C_6$ hydrocarbon chain with two sites of unsaturation. Oleic acid has a $C_{18}$ hydrocarbon chain with one site of unsaturation. Elaidic acid is the trans form of oleic acid. All of these unsaturated carboxylic acids are available from Sigma-Aldrich Corp. (St. Louis, Mo.).

In addition to using saturated or unsaturated carboxylic acid surfactants as the puddling additive, compounds having a phosphate group as the anionic, polar group may be used. For example, one effective additive is a mixture of 35–45% mono-, 50–60% di-phosphate ester in which a $C_{18}$ hydrocarbon chain is attached to the phosphate group by a chain of three ethylene oxide groups. This additive is commercially available in a neutral or acid form. In its acid form, the additive is polyoxyethylene (3) oleyl alcohol phosphate. In its neutral form, this additive is diethylammonium oleth-3-phosphate. Either form may be used as the puddling additive because they are converted to the neutral form when added to the inkjet ink.

The components of an exemplary inkjet ink are shown in Table 1, along with ranges of the amount of each component. The inkjet ink may be cyan, magenta, yellow, or black, depending on the dye that is used.

TABLE 1

Components Of The Inkjet Ink Composition

| Component | Wt % |
|---|---|
| Dye | Approximately 0.5 to 5 |
| Diol/polyglycol ether/glycol ether | Approximately 10 to 15 |
| Buffer | Approximately 0.2 |
| Preservative/biocide | Approximately 0.05 to 0.5 |
| Surfactant | Approximately 0.02 to 4 |
| Puddling additive | Approximately 0.1 to 2.0 |
| Water | Remainder |

The inkjet inks are formulated by combining the components using methods known in the art. The puddling additives described herein may be easily incorporated into existing formulation processes because the puddling additive is present in the inkjet ink in a low amount. Therefore, the puddling additive does not create solubility issues that require modifying existing formulation processes. Rather, the puddling additive is simply added to the inkjet inks along with other components of the inkjet ink. Since the puddling additives are easily incorporated into existing processes, the cost of reducing puddling is low.

Cyan, yellow, magenta, and black inkjet inks including the puddling additives described herein may be used as a set of inkjet inks in a color printer. The set of inkjet inks may be used to print high quality images on normal or specialty print media. While each of the inkjet inks in the set may include the puddling additive, it is also contemplated that the puddling additive may be present in at least one, but not all, of the inkjet inks. For example, if puddling is only problematic with the magenta ink, the magenta ink of the set of inkjet inks may comprise the puddling additive. If each of the inkjet inks in the set comprises the puddling additive, each of the inkjet inks may comprise the same puddling additive or a different puddling additive.

EXAMPLE 1

Inkjet Ink Compositions

Magenta inkjet inks comprising the components listed in Table 1 were produced. The dye used in these inkjet inks was a nickel-containing magenta dye available from Mitsubishi Chemical Corp. (Tokyo, Japan). Each of the inkjet inks comprised 0.4 wt % of a puddling additive. The puddling additives that were tested in the magenta inkjet inks are listed in Table 2.

TABLE 2

Puddling Results Of The Magenta Inket Inks

| General Chemical Category | Puddling Additive | Chemical Formula | Puddling score | % of no additive |
|---|---|---|---|---|
| Unsaturated Carboxylic Acid Surfactant | Linoleic acid | $C_{18}H_{32}O_2$ | 0 | 0 |
| | Elaidic acid (trans-oleic acid) | $C_{18}H_{34}O_2$ | 0 | 0 |
| | Oleic acid (cis-oleic acid) | $C_{18}H_{34}O_2$ | 0.1 | 2.9 |
| | trans-trans-2,4-hexadienoic acid | $C_6H_8O_2$ | 0.6 | 20.0 |
| | trans-cinnamic acid | $C_9H_8O_2$ | 2.2 | 68 |
| Saturated Carboxylic Acid Surfactant | Stearic acid | $C_{18}H_{36}O_2$ | 0.8 | 23.7 |
| | Palmitic acid | $C_{16}H_{32}O_2$ | 1.7 | 52.6 |
| | Myristic acid | $C_{14}H_{28}O_2$ | 2.7 | 82.6 |
| | Lauric acid | $C_{12}H_{24}O_2$ | 3.2 | 99.0 |
| Phosphate | polyoxyethylene (3) oleyl alcohol phosphate | $C_{24}H_{46}O_7P$ | 0.7 | 22.6 |
| Control Ink | None | | 3.2 | 100 |

To act as a control, inkjet inks lacking the puddling additive were produced.

The inkjet inks were formulated by direct mixing of the components. The pH of the inkjet inks was adjusted to between approximately 8.0 and 8.5 by the addition of sodium hydroxide. However, the pH of the inkjet ink comprising stearic acid as the puddling additive was adjusted to the same pH range using ammonium hydroxide. At this pH range, the puddling additives were present in the inkjet inks as sodium or ammonium salts of the puddling additive.

EXAMPLE 2

Puddling Results

The inkjet inks described in Example 1 were tested to determine their puddling characteristics. The inkjet ink was printed continuously over a full sheet of print medium. To determine the extent of puddling, the inkjet pen was removed before it was serviced and the amount of puddling on the printhead was visually observed.

Puddling was measured by visually observing the printhead after printing and assigning a "puddling score" to reflect the extent of puddling of each inkjet ink. A low puddling score indicated a low amount of puddling. Inkjet inks having a puddling score less than approximately 1.0 exhibited the greatest reduction in puddling. Puddling in each inkjet ink having the puddling additive was compared to puddling of the control inkjet ink, which lacked the puddling additive. A ratio of the puddling score of each inkjet ink having the puddling additive to the puddling score of the control inkjet ink is reported in Table 2 as the "% of no additive."

As shown in Table 2, the inkjet inks including linoleic acid, elaidic acid, or oleic acid as the puddling additive showed a reduction in puddling. These three puddling additives each have a carboxylate group as the anionic, polar group and an unsaturated, $C_{18}$ hydrocarbon tail. The inkjet ink having trans-trans-2,4-hexadienoic acid, which has a carboxylate group as the anionic, polar group and an unsaturated, $C_6$ hydrocarbon chain as the $C_6$–$C_{30}$ hydrocarbon tail as the puddling additive also exhibited reduced puddling.

The inkjet ink including stearic acid as the puddling additive also exhibited reduced puddling. Stearic acid has a carboxylate group as the anionic, polar group and a saturated, $C_{18}$ hydrocarbon chain as the $C_6$–$C_{30}$ hydrocarbon tail.

The inkjet ink including polyoxyethylene (3) oleyl alcohol N3 as the puddling additive also exhibited reduced puddling. Polyoxyethylene (3) oleyl alcohol has a phosphate group as the anionic, polar group and a $C_{18}$ hydrocarbon chain as the $C_6$–$C_{30}$ hydrocarbon tail.

EXAMPLE 3

Puddling of Polyoxyethylene (3) Oleyl Alcohol Phosphate Inkjet Compositions

Cyan, yellow, and magenta inkjet inks comprising 0.4 wt % of polyoxyethylene (3) oleyl alcohol phosphate were produced. Control inkjet inks lacking the polyoxyethylene (3) oleyl alcohol phosphate were also produced. The dyes used in these inkjet inks were DB199 cyan dye (available from Avecia (Wilmington, Del.)), AR52 magenta dye (available from Sensient Technologies (Milwaukee, Wis.)), and AY32 yellow dye (available from Sensient Technologies (Milwaukee, Wis.)). These inkjet inks were formulated as previously described.

Figure 1A:
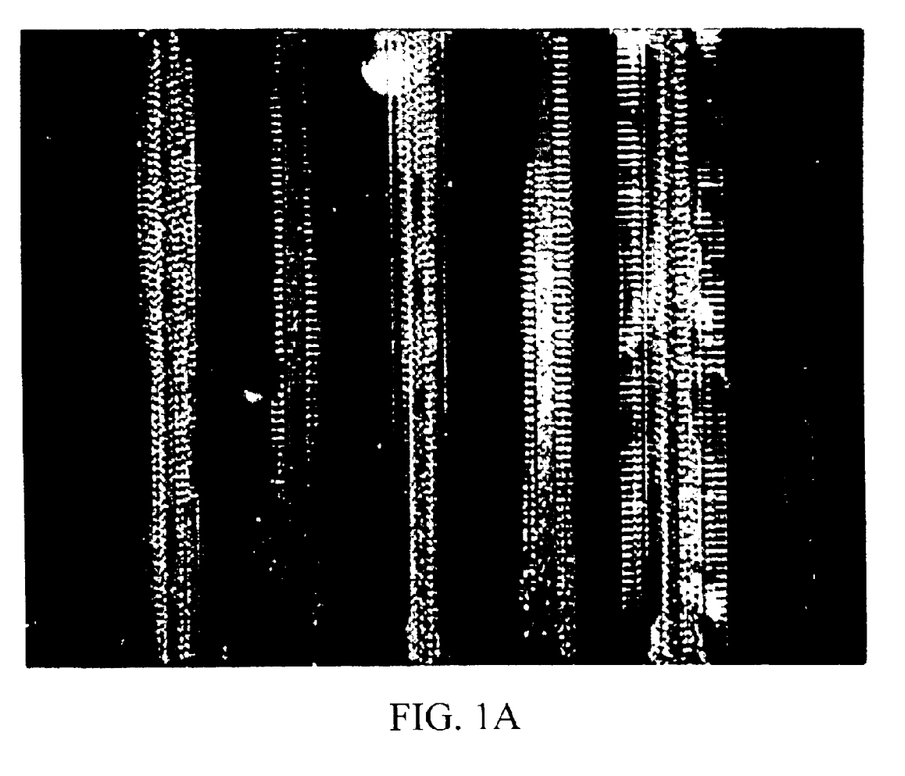
FIGS. 1A through 1D show the puddling properties of a inkjet ink lacking a puddling additive in one embodiment of the invention.
Figure 1B:
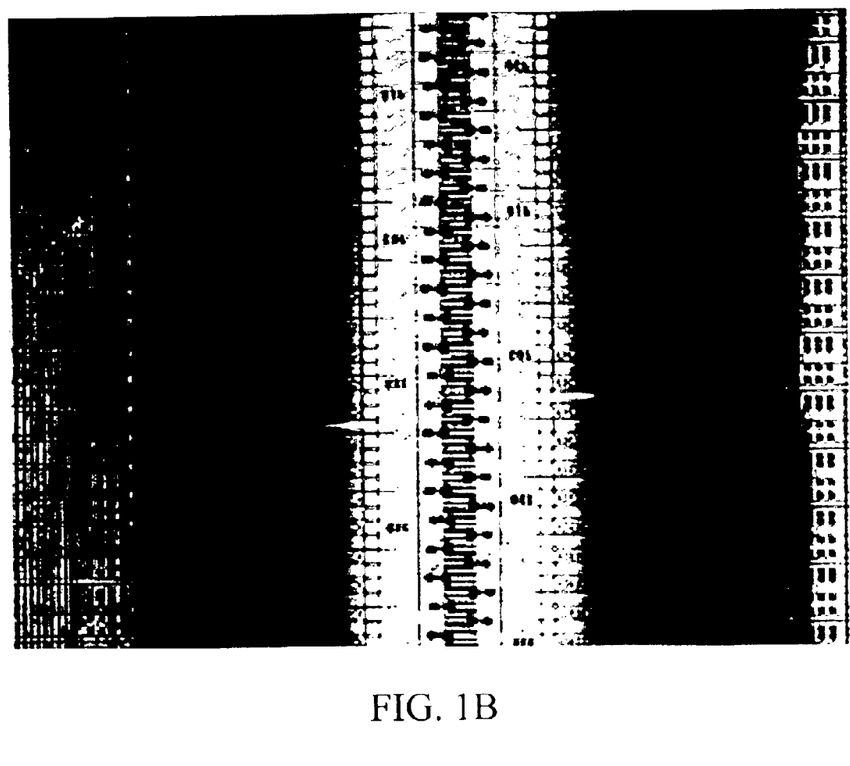
Figure 1C:
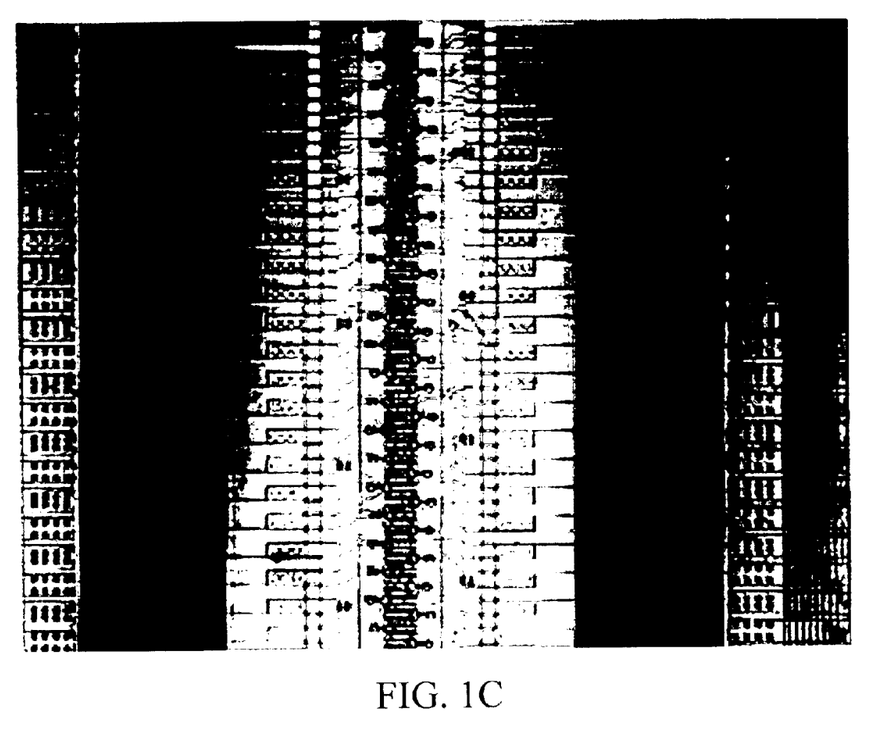
Figure 1D:
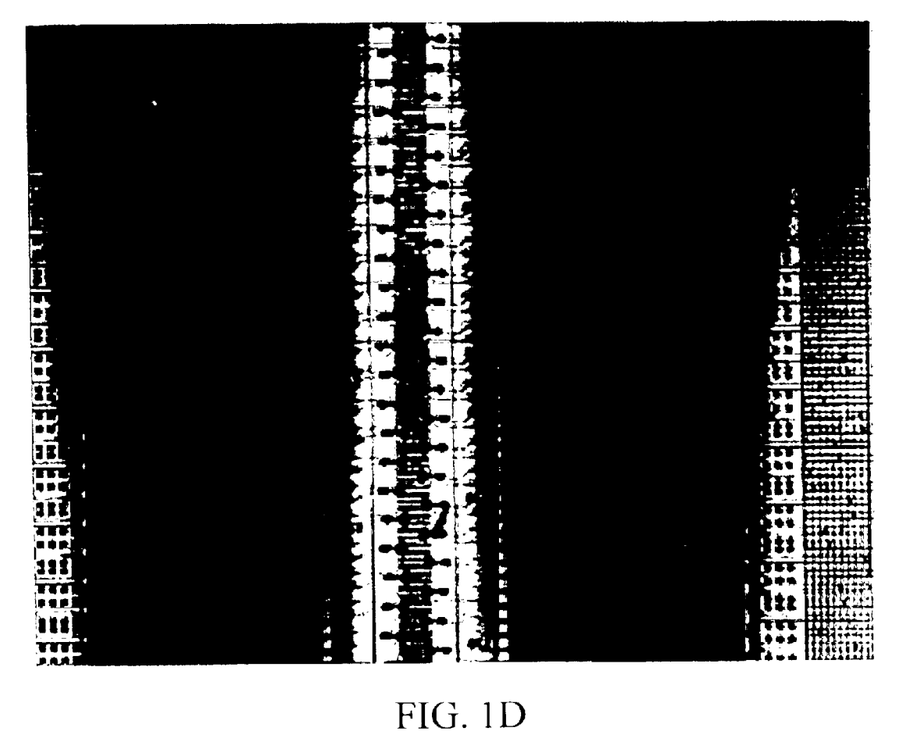
Figure 2A:
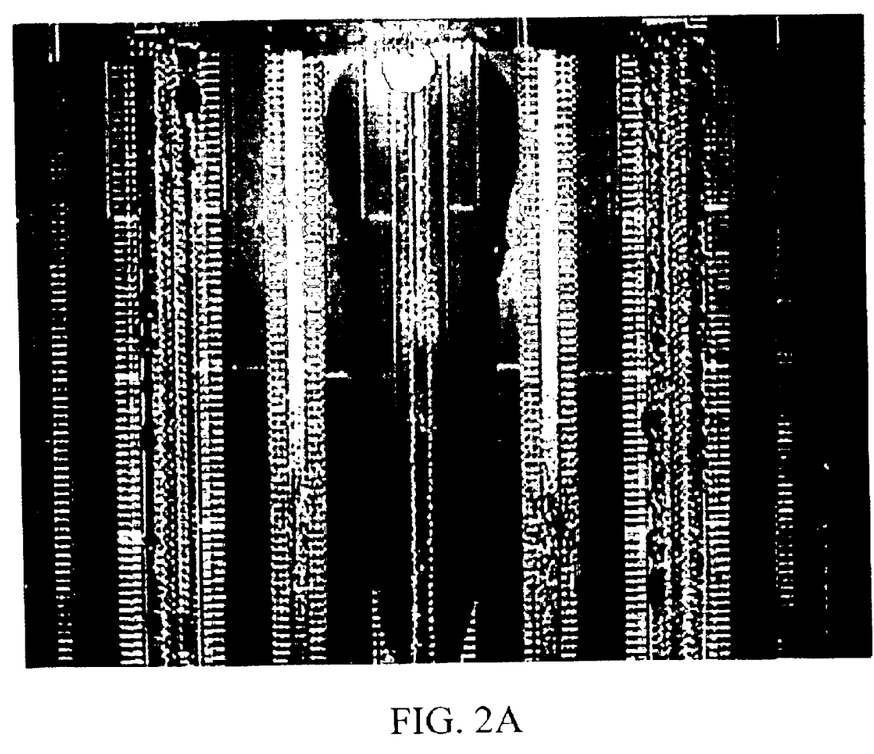
FIGS. 2A through 2D illustrate the puddling properties of an inkjet ink comprising a puddling additive in one embodiment of the invention.
Figure 2B:
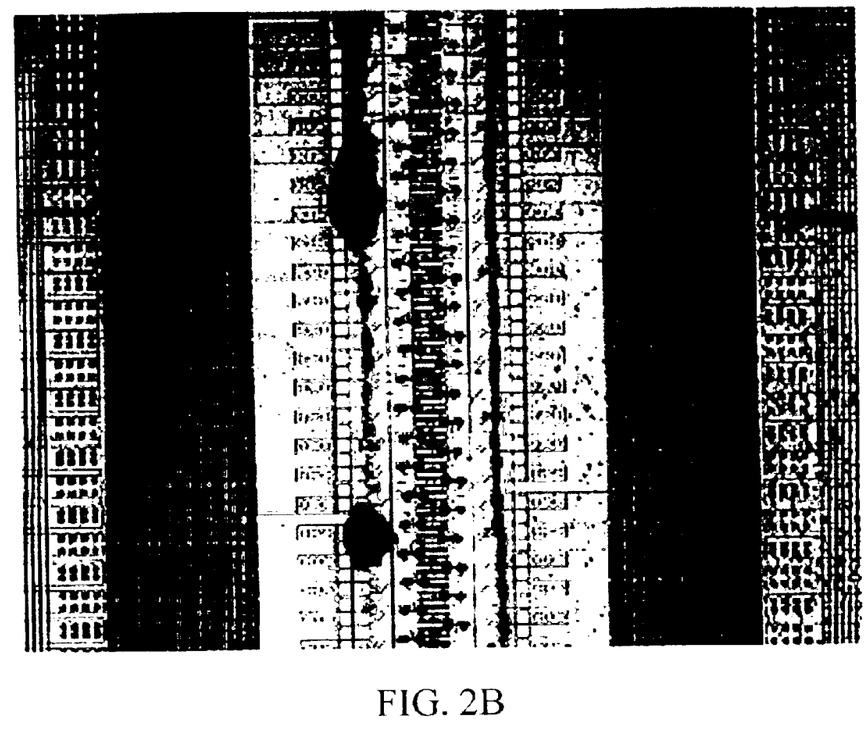
Figure 2C:
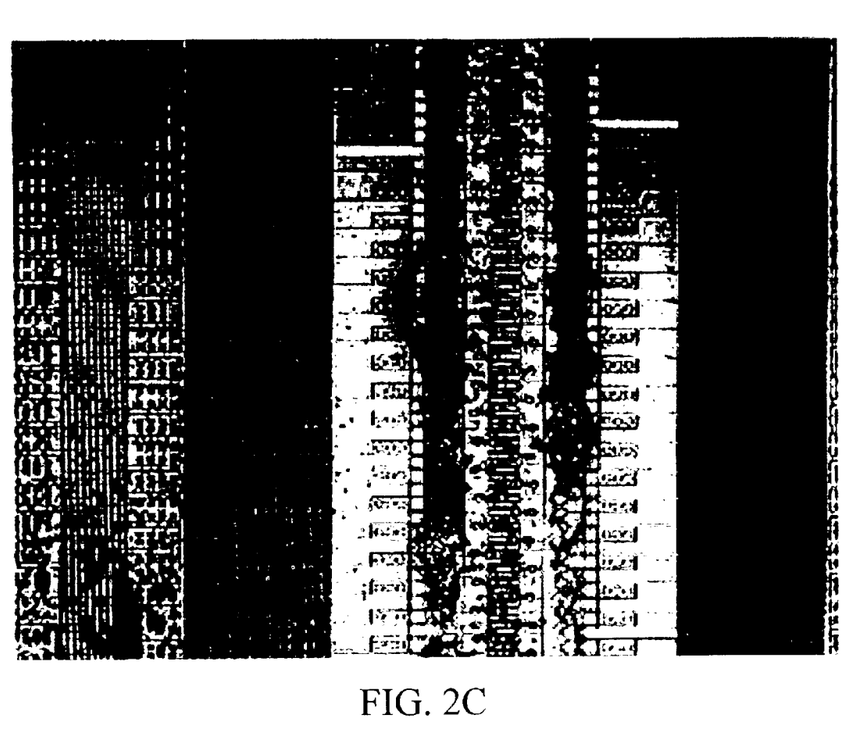
Figure 2D:
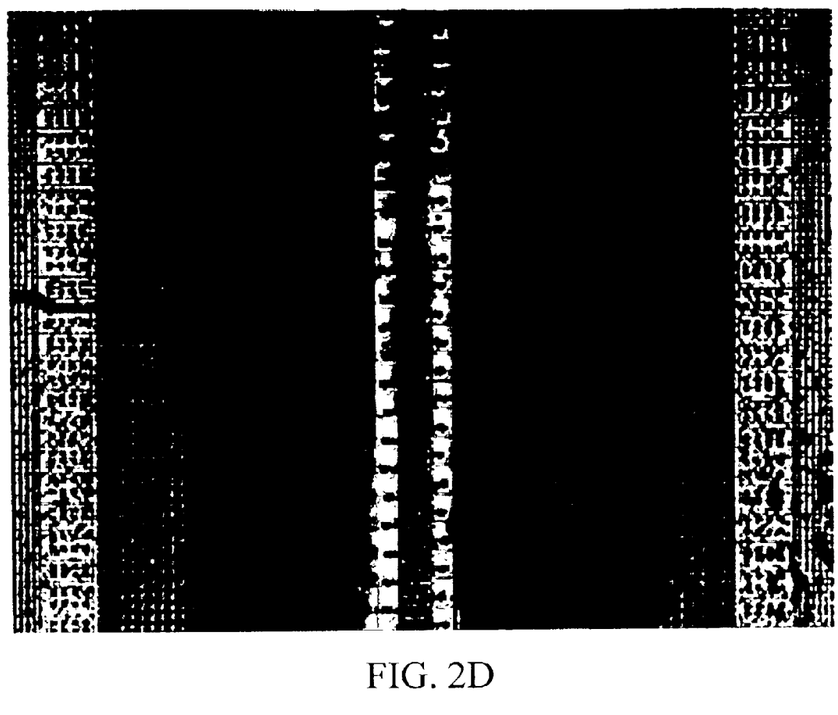

After the inkjet inks were printed, as previously described, photographs of the printhead were taken to determine the extent of puddling. FIGS. 1A–1D show the puddling in inkjet inks lacking polyoxyethylene (3) oleyl alcohol phosphate. FIG. 1A shows the amount of overall puddling on the printhead. FIGS. 1B, 1C, and 1D show the puddling of the cyan, yellow, and magenta inkjet inks, respectively, lacking polyoxyethylene (3) oleyl alcohol phosphate. In comparison, FIGS. 2A–2D show the puddling of the inkjet inks comprising polyoxyethylene (3) oleyl alcohol phosphate as the puddling additive. FIG. 2A shows the overall puddling on the printhead, while the puddling of the cyan, yellow, and magenta inkjet inks, respectively, are shown in FIGS. 2B–2D. The inkjet inks comprising polyoxyethylene (3) oleyl alcohol phosphate exhibited reduced puddling compared to the compositions lacking polyoxyethylene (3) oleyl alcohol phosphate.

EXAMPLE 4

Additional Puddling Additives

A puddling additive having a sulfocarboxylate, a phosphonocarboxylate, a sarcoside, a sulfate, a polyoxyethylene sulfate, a sulfonate, a phosphonate, a polyoxyethylene phosphate, a polyoxyethylene phosphonate, or a polyoxyethylene sulfonate as the anionic, polar group is synthesized or purchased.

In addition, a puddling additive having a hydrocarbon chain of 7 to 17 carbons in the $C_6$–$C_{30}$ hydrocarbon tail is synthesized or purchased. A puddling additive having a hydrocarbon chain with 7, 8, 10, 12, 15, or 17 carbons is synthesized or purchased.

A puddling additive having a hydrocarbon chain of 19 to 30 carbons in the $C_6$–$C_{30}$ hydrocarbon tail is also synthesized or purchased. A puddling additive having a hydrocarbon chain with 19, 20, 22, 24, 27, or 30 carbons is synthesized or purchased.

The puddling additives are formulated into inkjet inks and printed as previously described. Inkjet inks comprising these puddling additives exhibit reduced puddling.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An inkjet ink with reduced puddling, comprising:
  a dye;
  an inkjet vehicle; and
  a puddling additive comprising an anionic polar group selected from the group consisting of a carboxylate, a sulfocarboxylate, a phosphonocarboxylate, a sarcoside, a sulfate, a polyoxyethylene sulfate, a sulfonate, a polyoxyethylene sulfonate, a phosphonate, a polyoxyethylene phosphate, a polyoxyethylene phosphonate, and a phosphate group and a $C_6$–$C_{30}$ hydrocarbon tail, wherein the puddling additive is selected from the group consisting of linoleic acid, oleic acid, elaidic acid, trans-trans-2.4 -hexadienoic acid, stearic acid, diethylammonium oleth-3-phosphate, and polyoxyethylene (3) oleyl alcohol phosphate and wherein the puddling additive is present in an inkjet ink from approximately 0.1% by weight to approximately 2.0% by weight of a total weight of the inkjet ink.

2. The inkjet ink of claim 1, wherein the $C_6$–$C_{30}$ hydrocarbon tail is saturated.

3. The inkjet ink of claim 1, wherein the $C_6$–$C_{30}$ hydrocarbon tail comprises at least one carbon-carbon double bond.

4. The inkjet ink of claim 3, wherein the $C_6$–$C_{30}$ hydrocarbon tail has a cis stereochemistry about the at least one carbon-carbon double bond.

5. The inkjet ink of claim 3, wherein the $C_6$–$C_{30}$ hydrocarbon tail has a trans stereochemistry about the at least one carbon-carbon double bond.

6. The inkjet ink of claim 1, wherein the anionic polar group is a carboxylate group and the $C_6$–$C_{30}$ hydrocarbon tail has 6 to 18 carbon atoms.

7. The inkjet ink of claim 1, wherein the anionic polar group is a phosphate group and the $C_6$–$C_{30}$ hydrocarbon tail has 18 carbon atoms.

8. The inkjet ink of claim 1, wherein the puddling additive is present in the inkjet ink at approximately 0.4% by weight.

9. An inkjet ink composition, comprising:

a set of cyan, yellow, magenta, and black inks, each ink comprising a dye, an ink vehicle, and at least one puddling additive, the at least one puddling additive comprising an anionic polar group selected from the group consisting of a carboxylate, a sulfocarboxylate, a phosphonocarboxylate, a sarcoside, a sulfate, a polyoxyethylene sulfate, a sulfonate, a polyoxyethylene sulfonate, a phosphonate, a polyoxyethylene phosphate, a polyoxyethylene phosphonate, and a phosphate group and a $C_6$–$C_{30}$ hydrocarbon tail, wherein the at least one puddling additive is selected from the group consisting of linoleic acid, oleic acid, elaidic acid, trans-trans-2.4-hexadienoic acid, stearic acid, diethylammonium oleth-3-phosphate, and polyoxyethylene (3) oleyl alcohol phosphate and wherein the at least one puddling additive is present in the ink from approximately 0.1% by weight to approximately 2.0% by weight of a total weight of the ink.

10. The inkjet ink composition of claim 9, wherein the $C_6$–$C_{30}$ hydrocarbon tail is saturated.

11. The inkjet ink composition of claim 9, wherein the $C_6$–$C_{30}$ hydrocarbon tail is unsaturated.

12. A method for reducing puddling of an inkjet ink, comprising:

adding at least one puddling additive comprising an anionic polar group selected from the group consisting of a carboxylate, a sulfocarboxylate, a phosphonocarboxylate, a sarcoside, a sulfate, a polyoxyethylene sulfate, a sulfonate, a polyoxyethylene sulfonate, a phosphonate, a polyoxyethylene phosphate, a polyoxyethylene phosphonate, and a phosphate group and a $C_6$–$C_{30}$ hydrocarbon tail to an inkjet ink, wherein the at least one puddling additive is selected from the group consisting of linoleic acid, oleic acid, elaidic acid, trans-trans-2.4-hexadienoic acid, stearic acid, diethylammonium oleth-3-phosphate, and polyoxyethylene (3) oleyl alcohol phosphate, wherein the at least one puddling additive is present in the inkjet ink from approximately 0.1% by weight to approximately 2.0% by weight of a total weight of the inkjet ink, and wherein the inkjet ink comprises a dye and an ink vehicle.

13. The method of claim 12, wherein adding the at least one puddling additive comprising the anionic polar group and the $C_6$–$C_{30}$ hydrocarbon tail to the inkjet ink comprises adding the at least one puddling additive having a carboxylate or phosphate group as the anionic polar group and a saturated, $C_6$–$C_{30}$ hydrocarbon chain as the $C_6$–$C_{30}$ hydrocarbon tail.

14. The method of claim 12, wherein adding the at least one puddling additive comprising the anionic polar group and the $C_6$–$C_{30}$ hydrocarbon tail to the inkjet ink comprises adding the at least one puddling additive having a carboxylate or phosphate group as the anionic polar group and an unsaturated, $C_6$–$C_{30}$ hydrocarbon chain as the $C_6$–$C_{30}$ hydrocarbon tail.

15. The method of claim 14, wherein the unsaturated, $C_6$–$C_{30}$ hydrocarbon tail has a cis stereochemistry.

16. The method of claim 14, wherein the unsaturated, $C_6$–$C_{30}$ hydrocarbon tail has a trans stereochemistry.

17. The inkjet ink composition of claim 9, wherein the at least one puddling additive is present in the inkjet ink at approximately 0.4% by weight.

18. The method of claim 12, wherein the at least one puddling additive is present in the inkjet ink at approximately 0.4% by weight.

* * * * *

UNITED STATES PATENT AND TRADEMARK OFFICE
CERTIFICATE OF CORRECTION

PATENT NO. : 6,814,789 B2
DATED : November 9, 2004
INVENTOR(S) : Uhlir-Tsang et al.

It is certified that error appears in the above-identified patent and that said Letters Patent is hereby corrected as shown below:

Column 8,
Line 62, delete "trans-trans-2.4-hexadienoic acid," and insert therefor -- trans-trans-2,4-hexadienoic acid, --.

Column 9,
Line 37, delete "trans-trans-2.4-hexadienoic acid," and insert therefor -- trans-trans-2,4-hexadienoic acid, --.

Column 10,
Line 14, delete "trans-trans-2.4-hexadienoic acid," and insert therefor -- trans-trans-2,4-hexadienoic acid, --.

Signed and Sealed this

Twelfth Day of July, 2005

JON W. DUDAS
*Director of the United States Patent and Trademark Office*